US006985861B2

(12) United States Patent
Van Thong et al.

(10) Patent No.: US 6,985,861 B2
(45) Date of Patent: Jan. 10, 2006

(54) SYSTEMS AND METHODS FOR COMBINING SUBWORD RECOGNITION AND WHOLE WORD RECOGNITION OF A SPOKEN INPUT

(75) Inventors: Jean-Manuel Van Thong, Arlington, MA (US); Ernest Pusateri, Cambridge, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 714 days.

(21) Appl. No.: 10/017,797

(22) Filed: Dec. 12, 2001

(65) Prior Publication Data

US 2003/0110035 A1    Jun. 12, 2003

(51) Int. Cl.
*G10L 15/08* (2006.01)
(52) U.S. Cl. ...................... 704/254; 704/251
(58) Field of Classification Search ............... 704/254, 704/251; 379/88.01, 88.03, 88.04
See application file for complete search history.

(56) References Cited

U.S. PATENT DOCUMENTS

| 5,315,689 | A | * | 5/1994 | Kanazawa et al. | .......... 704/238 |
| 5,638,425 | A | * | 6/1997 | Meador et al. | .......... 379/88.01 |
| 5,920,837 | A | * | 7/1999 | Gould et al. | ................ 704/251 |
| 6,061,654 | A | * | 5/2000 | Brown et al. | ................ 704/275 |

OTHER PUBLICATIONS

Cormen, T.H. et al., "16.3, Longest Common Subsequence." In *Introduction to Algorithms*, The MIT Press, eds. (NY: McGraw-Hill), pp. 314-319 (1990).

* cited by examiner

*Primary Examiner*—Vijay Chawan
*Assistant Examiner*—Donald L. Storm

(57) ABSTRACT

A computer-based detection (e.g., speech recognition) system combines a word decoder and subword decoder to detect words (or phrases) in a spoken input provided by a user into a speaker connected to the detection system. The word decoder detects words by comparing an input pattern (e.g., of hypothetical word matches) to reference patterns (e.g., words). The subword decoder compares an input pattern (e.g., hypothetical words matches based on subword or phoneme recognition) to reference patterns (e.g., words) based on a word pronunciation distance measure that indicates how close each input pattern is to matching each reference pattern. The subword decoder sorts the source set of reference patterns based on a closeness of each reference pattern to correctly matching the input pattern based on generated pattern comparisons. The word decoder and subword decoder each provide an N-best list of hypothetical matches to the spoken input. A list fusion module of the detection system selectively combines the two N-best lists to produce a final or combined N-best list. The final or combined list has a predefined number of matches.

28 Claims, 5 Drawing Sheets

SYSTEMS AND METHODS FOR COMBINING SUBWORD RECOGNITION AND WHOLE WORD RECOGNITION OF A SPOKEN INPUT

BACKGROUND OF THE INVENTION

A user of a computer inputs or types in one or more keywords as the input to a search engine as a commonly, used method for accessing indexed content stored in a database. But, in numerous situations, typing is not the most convenient and effective means to input a query, while voice provides a natural and efficient interface. Speech recognition or detection software must recognize accurately the spoken words and perform the query indicated by the spoken input, or alternatively find a list of the closest words that match acoustically the input (a list of best candidate words, or N-best list). The user can then pick the proper word from the list and search the database using the selected word without typing more words.

Most speech recognition or detection systems use, more or less successfully, dialog based systems. The user is prompted to answer a series of questions. The dialog is usually modeled with finite state grammars. Because of their deterministic nature, finite state grammars are fairly rigid to use. Such a traditional system has to be designed such that every word and sentence expected to be spoken by the user are stored in the system.

Methods for computing the N-best lists are widely used in speech recognition and detection systems. These traditional methods usually decode the speech input and generate the N-best list of best candidates (words or sentences) using several basic sources of knowledge, such as word pronunciations, language models, or statistical grammars. The N-best list may then be re-ordered using additional sources of information, such as natural language processing.

SUMMARY OF THE INVENTION

The difficulty in the above traditional approaches is to generate an accurate initial N-best list. Speech decoders are very sensitive to the accuracy of word pronunciations. If a user speaks a word with a pronunciation that is significantly different from the ones listed in a reference pronunciation dictionary, then that word hypothesis (the correct choice) may very likely be pruned out during the search. Acoustic variability like background noise, poor quality microphones, or speaker accent, may also account for these problems in user pronunciation.

The method of the present invention described herein allows for acoustic variability by sorting a list of words using acoustic similarities to a spoken input or query. For each word from the list, a speech recognition or detection system computes a score that reflects how close acoustically the spoken query word is to the subject word on the list. The speech detection system then sorts a list of words based on these scores. The word that has the highest score is the closest to the spoken query word. The user interface displays the top N-best scores (typically the 5 best), and allows browsing further down the resultant sorted list.

The method of the present invention allows modeling user input so as to take into account the acoustic inaccuracy by returning the most likely answers to the user. The goal of the present invention is not to return the proper answer all of the time but rather to get the user close to the answer most of the time. More precisely, the method of the present invention builds the N-best list accurately, achieving performance in one example of over 93% accuracy within 5 best, on a vocabulary of 2,000 words.

Furthermore, the present invention provides a fusion system and method that combines both subword (phoneme) and word recognition to efficiently produce the N-best list of hypotheses. A fusion system operating according to the present invention runs separately two decoding threads or processes, the first performing subword recognition and the other word recognition on the same recorded utterance. The output of both processes is used to look up a list of words and to generate two N-best lists. The fusion system then combines the two lists to form a final sorted N-best list of words (or phrases), the most likely being at the top of the list.

The method of the present invention, in one embodiment, overcomes the problem of pruning of correct words (during the evaluation of potential matches to the spoken input) by re-sorting the whole vocabulary using a pronunciation distance measure, without performing any pruning.

The present invention provides for using different and uncorrelated sources of information to help to effectively compute the N-best list. The method of the present invention works well because subword (phoneme) recognition (associated with word look up), and word recognition are complementary approaches. Even with a simple fusion scheme according to the present invention, the fusion scheme outperforms traditional methods. The subword recognition approach is less constrained than the word recognition approach, which uses one or few alternate pronunciations. If the user pronounces the word slightly differently, the subword string produced may still be close enough to recover the word, although word recognition typically misses the mispronounced word completely.

The method for the subword detection aspect of the present invention is better than a traditional two-pass search for several reasons. First, it allows decoupling the recognition process (at least for subword detection) into two separate modules that can be run on two different platforms. Moreover, the first module (the phoneme recognizer or subword decoder) is vocabulary independent, so it does not need to be updated when new words are added. Typically, the subword decoder could run on a thin client, for instance as a plug-in component embedded in a browser, or on a handheld device. The second module (vocabulary look up), which is vocabulary dependent, can be run on the server side, and thus can be updated whenever the index for the content is modified. Second, in one embodiment, the method of the present invention sorts the whole vocabulary such that the size of the N-best list is not limited, unlike the traditional lattice-based search methods, which utilize pruning while decoding.

The approach of the present invention differs from the existing traditional methods that use phoneme recognition in several ways. The approach of the present invention trains a phoneme (or subword) confusion matrix and determines insertion/deletion costs directly from the decoder output of sample input. A training set of the sample input is used to run phoneme or subword recognition; the output is then aligned with the exact transcription to compute these costs. Furthermore, the approach of the present invention is a two stage process. The first stage is for decoding subword units, and the second stage is for looking up words from a predefined set of words (vocabulary or dictionary). The approach of the present invention also combines the output of a word decoder and the subword decoder by merging a list of closest words found by using a word distance metric based on the confusion matrix.

The present invention provides computer systems and methods for detecting words (and phrases) in a spoken input by combining a subword detection approach and a word detection approach. In a preferred embodiment of the invention, a computer system determines hypothetical matches (detected words or phrases) to a spoken input. The computer system includes a subword decoder, a word decoder, and list fusion module. The subword decoder detects subword units in the spoken input to generate a first set of hypothetical matches to the spoken input. The word decoder detects words in the spoken input to generate a second set of hypothetical matches to the spoken input. The list fusion module combines the first set of hypothetical matches with the second set of hypothetical matches to produce a combined set of hypothetical matches to the spoken input, the combined set having a predefined number of hypothetical matches.

In one aspect of the present invention, the combined set of hypothetical matches is an ordered list comprising a highest ranking hypothetical match in the second set of hypothetical matches, followed by an ordered set of hypothetical matches based on the first set of hypothetical matches.

In another aspect, the combined set of hypothetical matches is an ordered list based on ranking confidence levels for each hypothetical match.

In a further aspect, the subword units include one or more phonemes.

In another aspect, the hypothetical matches are words.

Furthermore, with regard to the subword detection aspect, the present invention provides systems and methods for detecting subwords (and phrases) in a spoken input. In a preferred embodiment of the present invention, a computer system determines hypothetical matches (e.g., words or phrases) to a spoken input by detecting subword units (e.g., phonemes or combinations of phonemes) in the spoken input. The computer system includes a subword decoder and a subword detection vocabulary look up module. The subword decoder detects the subword units in the spoken input based on an acoustic model of the subword units and a language model of the subword units. The subword detection vocabulary look up module for generating pattern comparisons between (i) an input pattern corresponding to the subword units in the spoken input and (ii) a source set of reference patterns based on a pronunciation dictionary. Each generated pattern comparison is based on the input pattern and one of the reference patterns. The subword detection vocabulary look up module generates a set of hypothetical matches by sorting the source set of reference patterns based on a closeness of each reference pattern to correctly matching the input pattern based on an evaluation of each generated pattern comparison. Each evaluation determines a word pronunciation distance measure that indicates how close each input pattern is to matching each reference pattern.

In one aspect, the pattern comparisons are based on a confusion matrix that stores the likelihood of confusion between pairs of subword units, as well as the likelihood of deleting or inserting each subword unit.

The computer system, in another aspect, includes a confusion matrix trained on an output of the subword decoder, the output produced from an acoustic input of a training data set input to the subword decoder.

In a further aspect, the subword detection vocabulary look up module determines the pairs of subword units by pairing an input subword unit from the input pattern with a reference subword unit from the reference pattern. The subword detection vocabulary look up module matches the input pattern to each of the reference patterns by evaluating for each pair of subword units a cost of insertion, a cost of substitution, and a cost of deletion as stored in the confusion matrix.

The confusion matrix, in another aspect, is based on determining an entry in the confusion matrix for each unique subword unit that is in the set of reference patterns.

In a further aspect, the subword decoder is part of a client computer, and the subword detection vocabulary look up module is part of a server computer.

The word pronunciation distance measure, in another embodiment, is based on the calculation of a distance metric between an input pattern and a reference pattern. The calculation includes determining a score of a subword of the input pattern matching a subword of the reference pattern. Further, the calculation includes determining the cost of substituting a given subword of the input pattern with a given subword of the reference pattern, the cost of deleting the given subword of the input pattern, and the cost of inserting the given subword of the reference pattern. The calculation includes determining a length penalty of the input pattern matching the reference pattern. For more detail, see the equations defining the distance metric provided in the detailed description.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
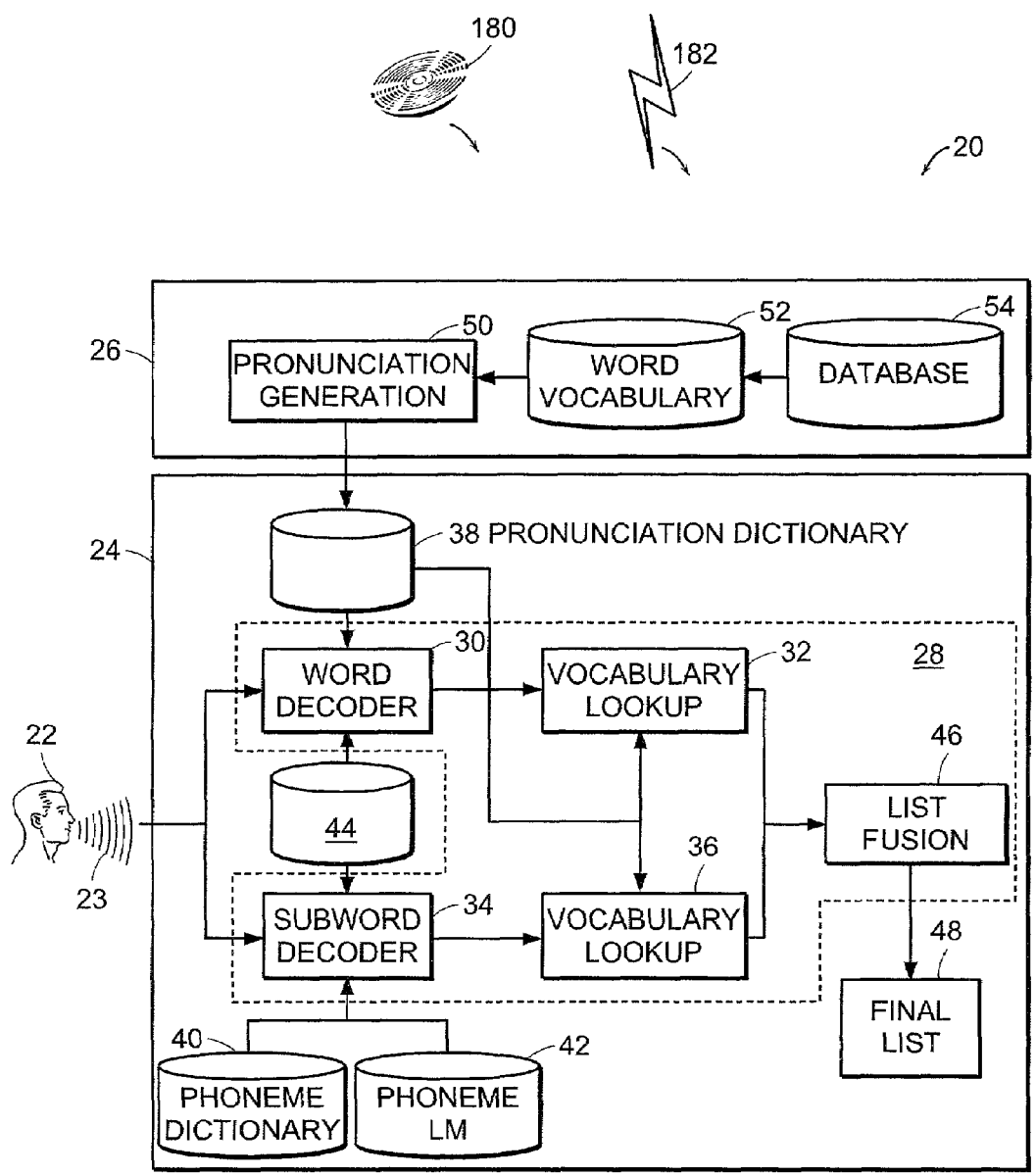
FIG. 1 is a block diagram of the components of a combined subword detection and word detection system according to the present invention.

FIG. 1 is a block diagram of the components of a combined speech recognition or detection system 20 including both a subword detection approach and a word detection approach according to the present invention. The speech detection system 20 includes a dictionary generator 26 and a fusion system 24. A user 22 of the system 20 provides a speech query or spoken input 23 that is input to the fusion system 24.

The dictionary generator 26 is a computing device such as a server, desktop computer or other suitable computing device. The dictionary generator 26 includes a pronunciation generation module 50, a word vocabulary 52, and a database 54. The word vocabulary 52 and database 54 are stored on one or more memory and/or data storage devices such as one or more hard discs. The database 54 is a source for words and speech patterns that make up the word vocabulary 52 (e.g., subset of words in the database 54), which represents words and acoustic patterns that may be commonly used by the user 22 when speaking the spoken input 23. The pronunciation generation module 50 of the dictionary generator 26 is a software or hardware module that converts the words and patterns of the word vocabulary 52 into acoustic strings that represent the words and patterns. For example, the acoustic string developed by the pronunciation generator 50 for a word may be based on subwords, phonemes, or other elements. The words can also be commonly used or recognized speech patterns, such as the alphabet. In a preferred embodiment, the dictionary generator 26 constructs the pronunciation dictionary 38 in a separate and preliminary stage, prior to the analysis of the spoken input 23.

The fusion system 24 includes a digital processor 28 which hosts and executes a word decoder 30, a first vocabulary look-up module 32, a subword decoder 34, a second vocabulary look-up module 36, and a list fusion module 46 in working memory. In other embodiments of the present invention, any or all of these components 30, 32, 34, 36, and 46 are implemented as hardware components (e.g., one or more ASIC's or application specific integrated circuits).

The word decoder 30 is a speech decoder that processes the spoken query 23 into a word or acoustic pattern. The word decoder 30 performs a single pass Viterbi decoding based on a three state HMM (Hidden Markov Model) topology. A sequence of phonemes generated by the word decoder 30 is constrained by the word pronunciations listed in the pronunciation dictionary 38 as input. The pronunciation dictionary 38 includes words and acoustic patterns stored as pronunciation strings that were generated by the pronunciation generation module 50 of the dictionary generator 26. The first vocabulary look-up module 32 (or word detection vocabulary look up module) forms a look-up in the pronunciation dictionary 38 to identify one or more words based on the output of the word decoder 30.

The subword decoder 34 is a speech decoder that processes the spoken query 23 into a sequence of subwords. In a preferred embodiment, each subword includes one or more phonemes. The subword decoder 34 computes a confidence score for each subword of the output. The subword decoder 34 runs a single pass Viterbi decoding based on a three state HMM topology to produce the most likely sequence of phonemes. Three states of the HMM respectively model the acoustic properties of the beginning, the middle, and the end of a phoneme. An N-gram phoneme language model score is applied at each phoneme transition (typically a bi-gram or a tri-gram model). At the end of the forward search pass, the subword decoder 34 extracts the best hypothesis and returns the best hypothesis with the associated confidence scores. The subword decoder 34 operates in conjunction with a phoneme dictionary 40 and a phoneme language model 42 which are both stored in data storage such as memory or long term data storage such as a hard disk. The second vocabulary look-up module 36 (or subword detection vocabulary look-up module) looks up words in the pronunciation dictionary 38 to match the output of the 25 subword decoder 34.

The fusion system 24 also includes a acoustic model database 44 that may be shared by both the word decoder 30 and the subword decoder 34. The acoustic model database 44 provides acoustic models of each subword (phoneme) based on training during a learning phase and training data set of acoustic input. The decoders 30, 34 use the acoustic models stored in the acoustic model database 44 to provide a score for each subword (phoneme) to the stored acoustic model that best matches that subword.

The list fusion module 46 is a module that is hosted by the digital processor 28 and functions to fuse the lists produced as output by the first vocabulary look-up 32 and the second vocabulary look-up 36 into a final list 48. For example, the list fusion module 46 may take the best or most likely match produced by the first word detection vocabulary look-up 32 and place this match at the top of the final list 48, and then take additional entries from those best or most likely matches from the output list of the second subword detection vocabulary look-up 36 to insert into to the final list 48 to produce a fused final list 48. The final list 48 thus represents a list of the most likely hypothetical matches, that is, words that are most likely to match the spoken input 23. In a preferred embodiment this final list 48 is an N-best list that represents a set of hypotheses that are the best or most likely matches to words in a spoken utterance or spoken input 23.

In one embodiment, a computer program product 180, including a computer usable medium (e.g., one or more CDROM's, diskettes, tapes, etc.), provides software instructions for the word decoder 30, word detection vocabulary look up module 32, the subword decoder 34, the subword detection vocabulary look up module 36, the list fusion module 46, and/or other components of the speech detection system 20. The computer program product 180 may be installed by any suitable software installation procedure, as is well known in the art. In another embodiment, the software instructions may also be downloaded over an appropriate connection. A computer program propagated signal product 182 embodied on a propagated signal on a propagation medium (e.g., a radio wave, an infrared wave, a laser wave, a sound wave, or an electrical wave propagated over the Internet or other network) provides software instructions for the word decoder 30, word detection vocabulary look up module 32, the subword decoder 34, the subword detection vocabulary look up module 36, the list fusion module 46 and/or other components of the speech detection system 20. In alternate embodiments, the propagated signal is an analog carrier wave or digital signal carried on the propagated medium. For example, the propagated signal may be a digitized signal propagated over the Internet or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer usable medium of the computer program product 180 is a propagation medium that the computer may receive and read, such as by receiving the propagation medium and identifying a propagated signal embodied in the propagation medium, as described above for the computer program propagated signal product 182.

Figure 2:
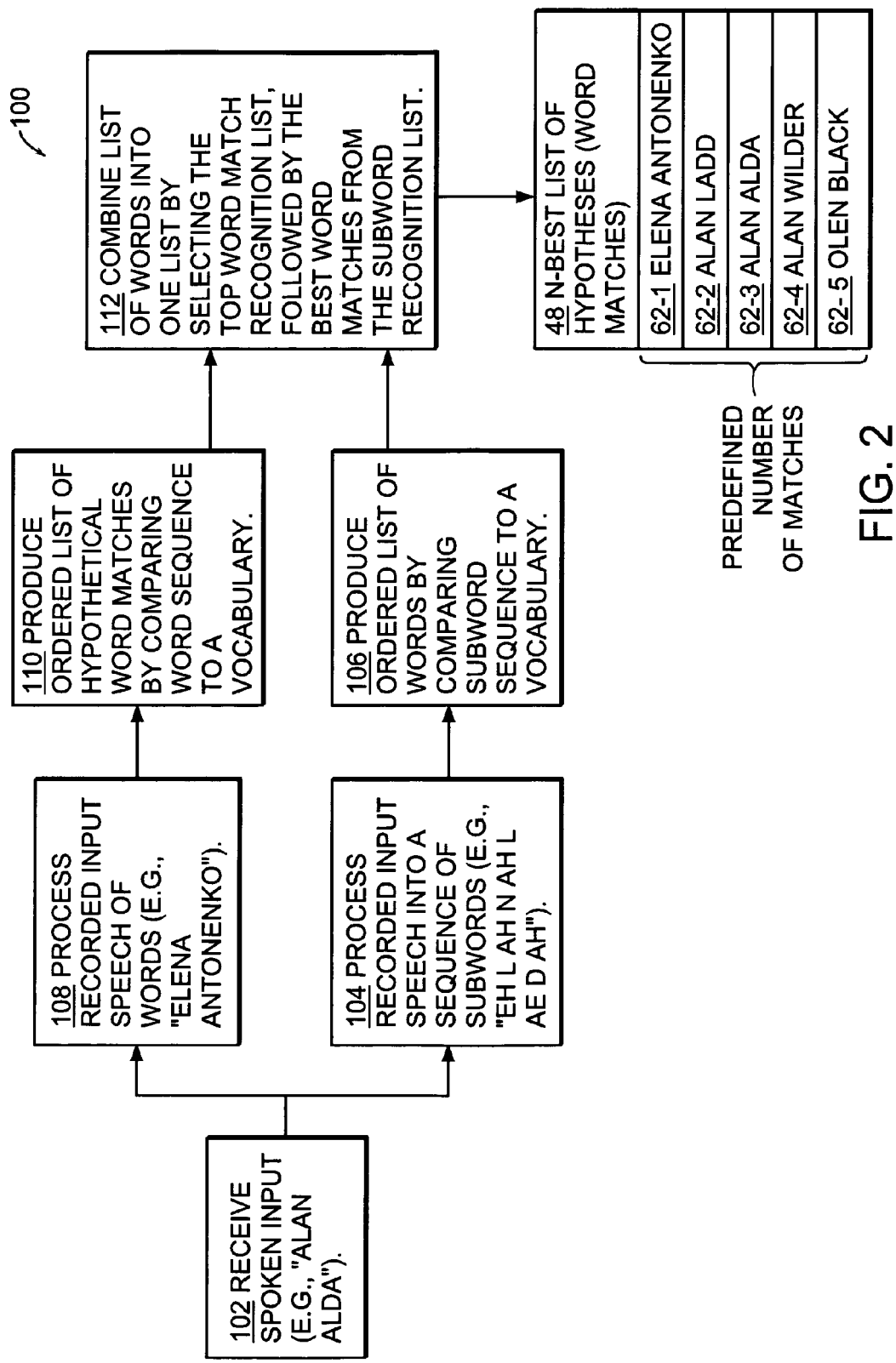
FIG. 2 is a flow chart of a procedure for processing a spoken query or input to produce a list of hypothetical word matches to that spoken input based on FIG. 1

FIG. 2 is a flow chart of a procedure 100 for processing a spoken query or input 23 to produce a list 48 of hypothetical word matches to that spoken input 23.

In step 102 the user 22 speaks the query or input 23 into a microphone attached to the speech detection system 20. The fusion system 24 receives the spoken input 23 and records this input 23 as recorded input speech.

In step 104 the subword decoder 34 processes the recorded input speech into a sequence of subword units or phonemes. For example, the spoken query 23 may be the words "Alan Alda." The subword decoder 34 may process this input speech into the following sequence of phonemes: "eh l ah n ah l ae d ah". This sequence of phonemes is a representation of the spoken input 23 as decoded by the subword decoder 34. The input phoneme sequence produced by the subword decoder 34 represents the best hypothesis extracted from processing and modeling the recorded input speech based on the spoken input 23. The subword decoder 34 returns the best hypothesis along with associated confidence scores.

In step 106 the second (subword detection) vocabulary look up 36 produces an ordered list of words by comparing the subword (or phoneme) sequence to a vocabulary such as the vocabulary contained in the pronunciation dictionary 38. The subword sequence produced by the subword decoder 34 in step 104 is compared to a list of reference words forming the index of the database 38. The second vocabulary look-up 36 produces an ordered list of words with the most likely pronounced word being at the top of the list. Every word of the index has one or more phoneme pronunciations. These pronunciations are produced by either a look up in an existing dictionary 38 (possibly hand-crafted) or generated algorithmically from a lexical tree. The lexical tree itself is trained from a large set of words selected from a specific domain proper names, for instance). Each phoneme of the pronunciation stream may have a confidence score as well, The input sequence of subwords is compared to each word of the list by using a classical dynamic programming technique. The comparison is done by aligning the input and output sequences in a way that minimizes the total cost of insertions, deletions, and substitutions required to transform one sequence into another.

The insertion, deletion, and substitution costs for pairs of phonemes (subwords) are pre-computed and stored into a phoneme (or subword) confusion matrix. The confusion matrix stores the likelihood of confusion between pairs of phonemes (subword units), the likelihood of deleting each subword unit, and the likelihood of inserting each subword unit. The confusion matrix is trained based on the output of a phoneme (or subword) decoder 34, which is produced from a training data set that is input to the subword decoder 34. The likelihood of confusion is determined for each pair of subwords in the matrix, and costs of insertions, deletion, and substitution for each pair of subwords can be calculated from the output from the subword decoder 34 based on the input training data set. The confusion matrix is computed by determining an entry in the confusion matrix for each unique subword unit that is in the set of reference patterns. Each entry is calculated from the output from the subword decoder 34 based on the input training data set.

In a preferred embodiment, the confusion matrix is based on 40 phonemes and the matrix is a 40 cell by 40 cell matrix. In another embodiment, the confusion matrix is based on subword units that may include two or more phonemes in each subword unit (e.g., about 5000 to 7000 subword units). For example, about 5000 subword units form a confusion matrix of a corresponding size (e.g., 5000 cell by 5000 cell matrix). In a preferred embodiment, the confusion matrix is trained in a separate training or learning phase prior to the processing of the spoken input 23 as described in this procedure 100. That is, the training of the confusion matrix typically precedes step 102.

In step 108 the word decoder 30 processes the recorded input speech based on the spoken input 23 into a sequence of words. For example, the word decoder 30 may process the spoken input 23 into the words "Elena Antonenko". The sequence of phonemes is constrained by the word pronunciations listed in the pronunciation dictionary 38 as input. Alternate pronunciations of the same word may be used by the word decoder 30. The most likely word is generated. When the word decoder 30 performs isolated word recognition there is no requirement for a word language model. Eventually the word decoder 30 may aggregate two or more words into a single word. The pronunciation of this compound word is the concatenation of the pronunciations of the initial words.

In step 110 the first (word detection) vocabulary look-up 32 produces an ordered list of hypothetical word matches by comparing the word sequence produced by the word decoder 30 to a vocabulary such as the vocabulary stored in the pronunciation dictionary 38. The words are looked up by the first vocabulary look-up 32 in a manner that is generally similar to what has been described for step 106. The first vocabulary look-up 32 expands the word output produced by the word decoder 30 into one or more phoneme pronunciation strings generated from the pronunciation dictionary 38. The phoneme strings are used to re-sort the whole vocabulary, and the words with the closest pronunciations to the given word are placed at the top of the list. The result then is an ordered list of words produced by the first vocabulary look-up 32 with the most likely matches or best hypothetical matches placed at the top of this list.

In step 112 the list fusion module 46 combines the lists of words from the vocabulary look-up modules 32, 36 into one final list 48 (e.g., N-best list). The list fusion module 46 places the top word match from the word recognition list from the first vocabulary look-up 32 at the top of final list 48. Then the list fusion module 46 places the next items in the list 48 from the best word matches from the subword phoneme) recognition list produced by the second vocabulary look-up 36. In other words, the list fusion module 46 performs a fusion scheme that consists of taking the first word from the list produced by the first vocabulary look-up 32 and pre-pending it to the list produced by the second vocabulary look-up 36. Other fusion or combination techniques are suitable.

The N-best hypotheses or word matches list 48 in FIG. 2 shows a list of entries 62. The first entry 62-1 is the word match at the top of the word recognition list produced by the first vocabulary look-up 32 in step 110. The next four entries in the N-best list 48 represent the best matches from the ordered subword recognition list produced by the second vocabulary look-up 36 in step 106. These entries are 62-2, 62-3, 62-4, and 62-5. In this example, as shown in FIG. 2, the entry 62-3 is for "Alan Alda" which matches the spoken input 23 provided by the user 22 as shown in step 102.

The fusion scheme, illustrated by the procedure 100 in FIG. 2, takes advantage of merging the two approaches. That is, the two approaches are the word detection or recognition approach, performed by steps 108 and 110, and the subword (phoneme) detection or recognition approach, performed by steps 104 and 106. The word recognition approach tends to produce a good match or hypothesis for the top word on the list. In other words, the first hypothesis on the list produced by the word detection vocabulary look-up 32 is likely to match the spoken input 23. In general, in the word recognition approach the words that are matched are highly constrained by the pronunciation in the word dictionary 38 and must follow the sequence of the pronunciation of the sequence of phonemes. Thus, the word recognition approach misses a hypothetical match on occasion and is not close to the correct match at all. That is, if the word recognition approach is not successful, then none of the words on the ordered list produced on the first vocabulary look-up 32 are likely to match the spoken input 23. That is, conducting further searching or producing a longer list from the first vocabulary look-up 32 is not likely to produce a successful match with the spoken input 23.

In contrast, the subword recognition approach (steps 104 and 106) can be characterized as a looser type of search and allows any likely pronunciation as captured by the bigrams and trigrams for the phonemes. Thus, for a subword recognition approach, a successful match is likely to be found if the second vocabulary look-up 36 continues to search and continues to produce a longer list of hypothetical matches.

Thus, the fusion approach described in the procedure 100 in FIG. 2 takes advantage of the best aspects of both the word recognition approach represented by steps 108 and 110 and the subword recognition approach represented by steps 104 and 106. In step 110 the word recognition approach is likely to produce a successful hypothetical match at the top of the list produced by the first vocabulary look-up 32. Thus, this top match or hypothesis is included as the first entry in the N-best list 48, for example, 62-1. By including the other entries from the phoneme recognition approach, the N-best list 48 is likely to include a successful match among those entries from the list produced from the second vocabulary look-up 36. Thus, with the combined list 48 there is a higher probability that some match will be successful to the spoken input 23 than if either the word recognition approach is used alone or the subword recognition approach is used alone.

In other embodiments, the present invention is not constrained to produce an N-best list of hypotheses 48 as described for FIG. 2. The N-best list 48 may be produced by using alternate approaches. For example, the best choices from the ordered list produced in step 110 from the first vocabulary look-up may be interleaved with the best choices produced in step 106 by the second vocabulary look-up 36. In another embodiment, if a hypothetical word match appears on both lists produced by the vocabulary look-up 32 and vocabulary look-up 36, then the fusion module 46 places that word at the top of the N-best list 48. In another embodiment, the list fusion module 46 may place the top two word matches, rather than only the top word match, produced by the vocabulary look-up 32, at the top of the N-best list of hypotheses 48.

Figure 3:
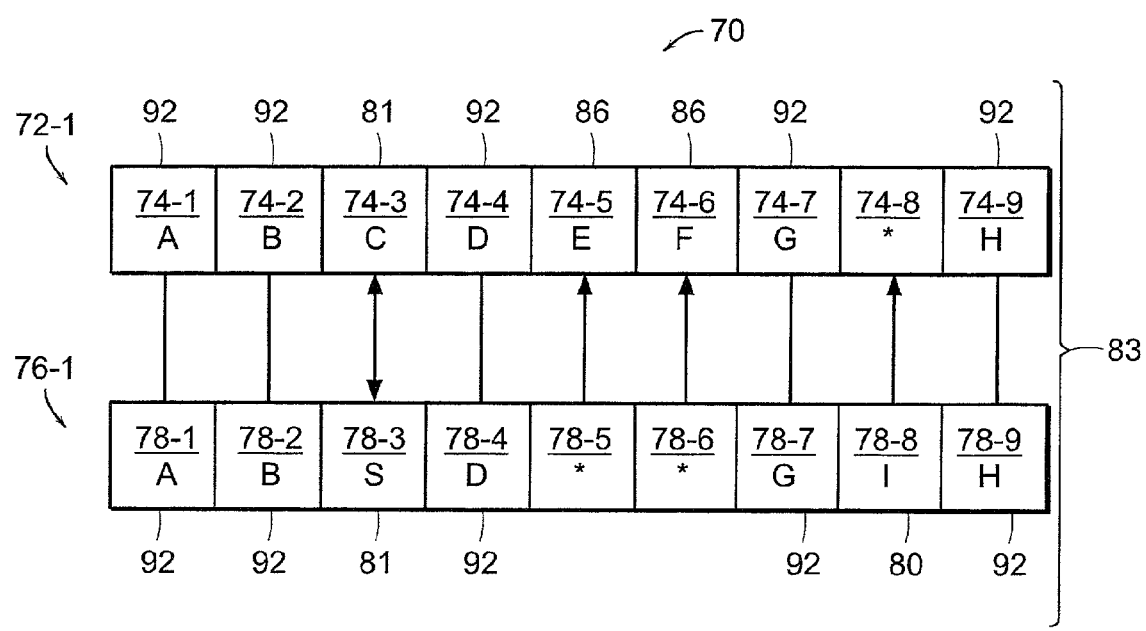
FIG. 3 is a block diagram of an input pattern of subword units compared to a reference pattern of subword units according to the present invention.

FIG. 3 is a block diagram for the comparison of an input pattern 76-1 to a reference pattern 72-1 based on the subword recognition approach using the subword decoder 34 and second (subword detection) vocabulary look up 36. The reference pattern 72 (e.g., 72-1 in FIG. 3, and 72-2 in FIG. 4) is a sequence of subword units (e.g., phonemes or a combination of phonemes) that represent a word stored in the word dictionary 38. The subword units 74 include phonemes for letters in the alphabet, shown in this example in FIG. 3 by the letters, rather than by phonemes. The example in FIG. 3 shows letter "A" 74-1, letter "B" 74-2, letter "C" 74-3, letter "D" 74-4, letter "E" 74-5, letter "F" 74-6, letter "G" 74-7 and letter "H" 74-9. The subword unit 74-8 contains an asterisk (*), which indicates that it is not part of the reference pattern 72-1, but indicates a position corresponding to an insertion 80 (78-8 from the input pattern 76-1). In this example in FIG. 3, the subword units 74-1 through 74-9 indicate the first letters of the alphabet from "A" through "H". The input pattern 76 (e.g., 76-1 in FIG. 3, and 76-2 in FIG. 4) is a sequence of subword units 78 that are produced by the subword decoder 34 from the spoken input 23 provided by the user 22. The input pattern 76-1 in FIG. 3 includes the letter "A" 78-1, letter "B" 78-2, letter "S" 78-3, letter "D" 78-4, letter "G" 78-7, letter "I" 78-8, and letter "H" 78-9. The second subword detection vocabulary look up 36 compares the input pattern 76-1 to the reference pattern 72-1. The subword unit 78-5 and 78-6 contain an asterisk (*), which indicates that these subwords 78-5, 78-6 are not part of the reference pattern 72-1, but indicates a position corresponding to deletions 86 (74-5 and 74-6 from the reference pattern 72-1). In FIG. 3, subword 74-3 and 78-3 are substitutions 81; that is, either subword 74-3 or 78-3 could be substituted for the other ("C" for "S" or "S" for "C").

To determine how closely the two patterns, 76-1, 72-1, match, the second vocabulary lookup 36 produces a word pronunciation distance measure or matching score 83 that represents how closely the patterns, 76-1, 72-1, match and how likely it would be for the input pattern 76-1 to match the reference pattern 72-1. In an actual evaluation, the second vocabulary lookup 36 would compare the input pattern 76-1 to a large number or all of the words in the pronunciation dictionary 38. Thus the reference pattern 72-1 represents only one reference pattern that might be available from a pronunciation dictionary 38. In the example shown in FIG. 3, some subword units 74 from the reference pattern 72 will match some subword units 78 in the input pattern 76-1, and some subword units 74 from the reference pattern 72-1 will not match some of the subword units 78 in the input pattern 76-1. Thus subword units 74-1, 74-2, 74-4, 74-7, and 74-9 are matches 92 that are the same as subword units 78-1, 78-2, 78-4, 78-7, and 78-9, respectively. Subword units 78-8 is an insertions 80 that would need to be inserted into the reference pattern 72-1 in order to have a match between the input pattern 76-1 and the reference pattern 72-1 (as well as other changes). Subword units 74-5 and 74-6 are deletions 86 that would have to be deleted from the reference pattern 72-1 to have a match (as well as other changes). From the standpoint of the input pattern 76-1, subword units 74-5 and 74-6 can also be viewed as insertions that would have to be inserted into the input pattern 76-1 to have a match between the input pattern 76-1 and the reference pattern 72-1 (as well as other changes). In order to calculate the matching score 83, the vocabulary lookup 36 calculates the cost of the insertions 80, the cost of any deletions 86. and the cost of substitutions 81 that would be needed for the reference pattern 72-1 to match up to input pattern 76-1. The process is described in more detail in FIG. 5.

The second vocabulary lookup 36 calculates the matching score 83 by determining how many subwords 74 in the reference pattern 72-1 match the subwords 78 in the input pattern 76-1 as well as the score or a cost for each insertion 80, each deletion 86, and each substitution 81. The resulting matching score 83 is compared to other scores 83 for other reference patterns 72 from the pronunciation dictionary 38 compared to the same input pattern 76-1. Thus the vocabulary lookup 36 compares the input pattern 76-1 to all of the reference patterns 72 in the pronunciation dictionary 38. As indicated by FIG. 3, the pronunciation dictionary 38 is not constrained to store only recognizable words but can score other kinds of patterns such as the alphabetic pattern indicated by reference pattern 72-1.

In one embodiment, the second vocabulary look up 36 compares the input pattern 76-1 to the reference pattern 72-1 using a classical dynamic progranmming technique, as described, for example, in Cormen, Thomas H., Leiserson, Charles E., and Rivest, Ronald L., *Introduction to Algorithms*, MIT Press, Cambridge, Mass., 1990 (see pages 314–319). In this approach of the present invention, the input pattern 76 is compared to all reference patterns 72 in a set of reference patterns provided by the pronunciation dictionary 38. The pronunciation dictionary 38 may be constrained to a specific set of words, such as proper names, that conforms to an expected input for the spoken input 23.

In one embodiment, the second vocabulary look up 36 constructs a lattice (or tree) of hypotheses. In the lattice approach, an input pattern 76 is compared to reference patterns 72 that have similar subwords in the first positions of the patterns 72, 76. For example, the input pattern 76-1 has subwords "A" 78-1 and "B" 78-2 in the first positions of the input pattern 76-1, and would be compared to reference patterns 72 that also have the same two subwords in the first positions of the reference pattern, such as reference pattern 72-1 that has the subwords "A" 74-1 and "B" 74-2 in the first two positions. In this approach of the present invention, the input pattern 76 is compared to a subset of the reference patterns 72 provided by the pronunciation dictionary 38, based on the reference patterns 72 having the appropriate subwords 78 in the initial positions of the input pattern 76.

Figure 4:
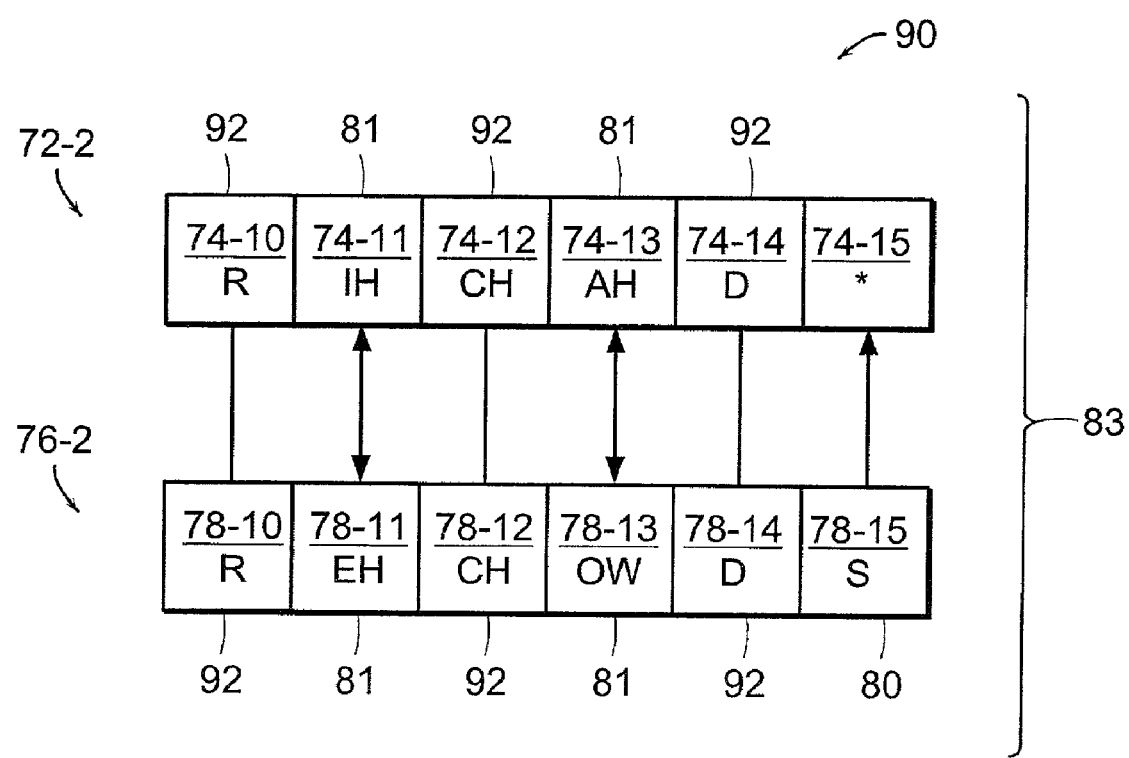
FIG. 4 is a block diagram of a input pattern of phonemes compared to a reference pattern of phonemes according to the present invention.

FIG. 4 is a block diagram of a input pattern 76-2 of phonemes 78-10 through 78-15 compared to a reference pattern 72-2 of phonemes 74-10 through 74-14 based on the subword recognition approach using the subword decoder 34 and second (subword detection) vocabulary look up 36. The input pattern 76-2 includes the phonemes "R" 78-10, "EH" 78-11, "CH" 78-12, "OW" 78-13, "D" 78-14, and "S" 78-15. The reference pattern 72-2 includes the phonemes "R" 74-10, "IH" 74-11, "CH" 74-12, "AH" 74-13, and "D" 74-14. The phonemes 74-10, 74-12, and 74-14 are matches 92 that match phonemes 78-10, 78-12, and 78-14. The phoneme 78-15 is an insertion 80 that could be inserted in the position indicated by 74-15 (indicated by an asterisk) in the reference pattern 72-2. That is, the phoneme 78-15 would have to be inserted into the reference pattern 72-2 in order to make the input pattern 76-2 match the reference pattern 72-2 (along with other changes). From the standpoint of the reference pattern 72-2, the phoneme 78-15 could be viewed as a deletion 86. That is, the phoneme 78-15 would have to be deleted from the input pattern 76-2 to make the input pattern match the reference pattern 72-2 (along with other changes). The phonemes 78-11 and 78-13 are substitutions 81. That is, phoneme 74-11 would be substituted for phoneme 78-11 and phoneme 74-13 would be substituted for phoneme 78-13 to make a match between the input pattern 76-2 and the reference pattern 72-2 (along with other changes). The word pronunciation distance measure or matching score 83 represents how closely the patterns, 76-2, 72-2, match and how likely it would be for the input pattern 76-2 to match the reference pattern 72-2.

Figure 5:
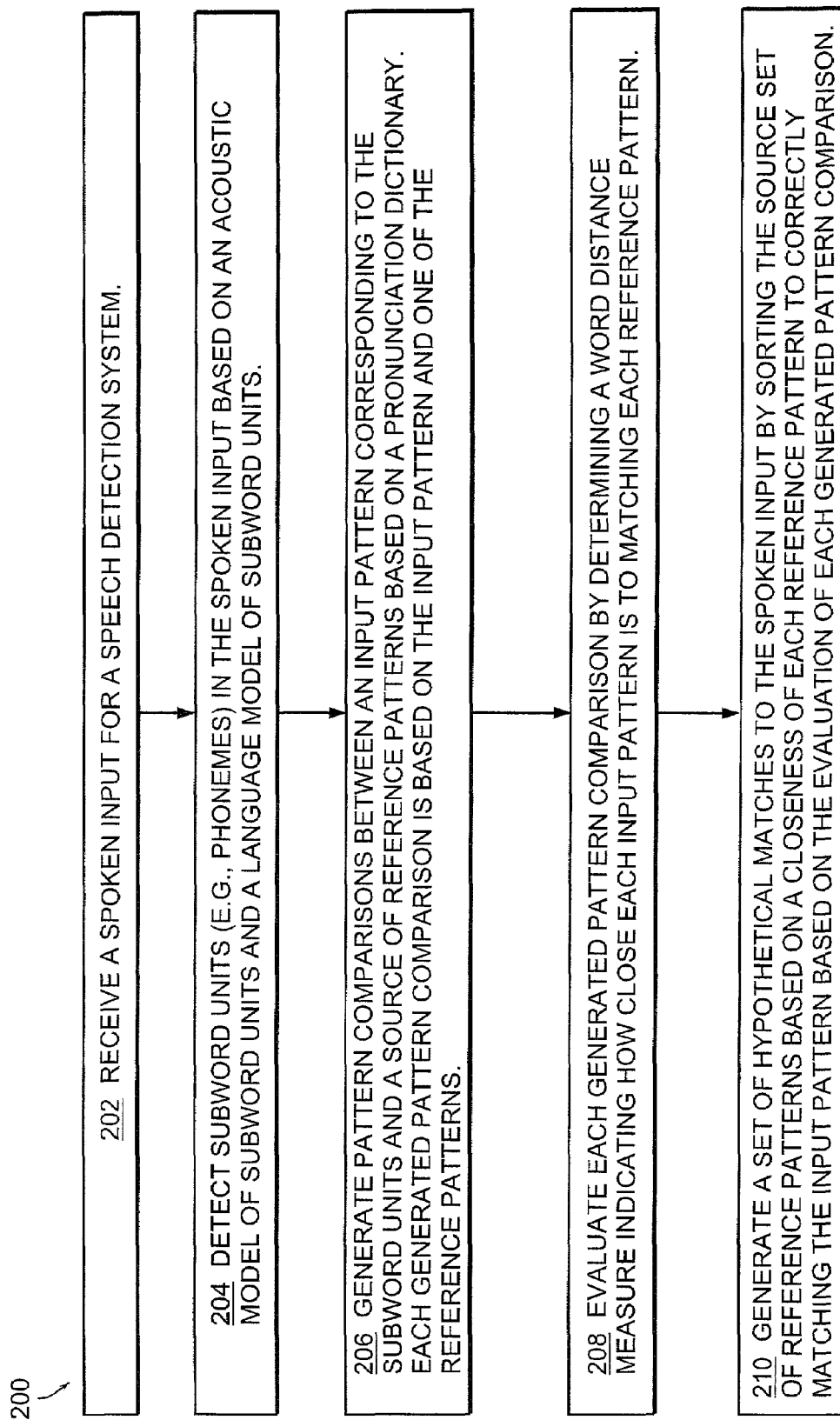
FIG. 5 is a flowchart of a procedure for detecting hypothetical matches to a spoken query or input by detecting subword units in the spoken query according to the present invention.

FIG. 5 is a flowchart of a procedure 200 for detecting hypothetical matches to a spoken query or spoken input 23 by detecting subword units in the spoken query 23 based on the subword recognition approach using the subword decoder 34 and second (subword detection) vocabulary look up 36.

In step 202, the subword or phoneme decoder 34 receives recorded speech input based on the spoken input 23 provided by the user 22 of the speech detection system 20.

In step 204, the phoneme decoder 34 detects subword units (e.g., phonemes or combinations of phonemes) in the spoken input 23 based on an acoustic model stored in the database 44 and language model which is stored in a phoneme language model database 42 as shown in FIG. 1. The subword units may be syllables or parts of words such as phonemes or combinations of phonemes.

In step 206, the second subword detection vocabulary look up 36 generates pattern comparisons between an input pattern 76 corresponding to the subword units detected in step 204 and a source set of reference patterns 72 based on a pronunciation dictionary 38. Each generated pattern comparison is based on the input pattern 76 and one of the reference patterns 72.

In step 208, the second vocabulary look up 36 performs an evaluation of each generated pattern comparison. Each such evaluation determines a word pronunciation distance measure 83. For example, the word pronunciation distance measure 83 indicates how close each input pattern 76 is to matching each reference pattern 72. While performing this evaluation, in one embodiment, the second vocabulary look up 36 retains in the sorted set of reference patterns 72 all of the reference patterns 72 until all of the evaluations are complete. In other words, the second vocabulary look up 36 does not perform any pruning or preliminary deletion of any reference patterns 72 until the input pattern 76 has been compared to all of the reference patterns 72 that are in the initial set of reference patterns 72. In another embodiment, the second vocabulary look up 36 only keeps the best hypothesis and prunes out the reference patterns 72 below a given threshold.

Typically, the source set of reference patterns 72 is based on the full contents of the word dictionary or the pronunciation dictionary 38. In some embodiments the source set of reference patterns 72 is based on some sub-set of words or patterns in the word dictionary 38.

In a preferred embodiment, the word pronunciation distance measure 83 is computed by calculating a distance metric 83 for each pair of subword units. The distance metric 83 is defined as follows:

$$S(p_0, d_0) = 0$$

$$S(p_i, d_j) = \min \begin{Bmatrix} S(p_{i-1}, d_{j-1}) + C_{subs}(p_i, d_j) \\ S(p_{i-1}, d_j) + C_{del}(p_i) \\ S(p_i, d_{j-1}) + C_{ins}(d_j) \end{Bmatrix}$$

$$S(P, D) = S(p_n, d_m) + LP(p_n, d_m)$$

wherein:
S(P,D) is a distance between word P and D; P is a given input pattern 76, and D, a given reference pattern 72;
$S(p_i, d_j)$ is a score of the given input pattern 76 matching a given subword unit $p_i$ of P, and a given subword unit $d_j$ of D;
$C_{subs}(p_i, d_j)$ is a cost of substituting the given subword unit $p_i$ of P with the given subword unit $d_j$ of D;
$C_{del}(p_i)$ is a cost of deleting the given subword unit $p_i$ of P;
$C_{ins}(d_j)$ is a cost of inserting the given subword unit $d_j$ of D;
$LP(p_i, d_m)$ is a length penalty of the given input pattern $p_n$ 76 matching the given reference pattern $d_m$ 72, n is the length of P, and m is the length of D;
$S(p_{i-1}, d_{j-1})$ has a value of zero (0) if $p_{i-1}, d_{j-1}$ is undefined;
$S(p_{i-1}, d_j)$ has the value of zero (0) if $p_{i-1}, d_j$ is undefined;
$S(p_i, d_{j-1})$ has the value of zero (0) if $p_i, d_{j-1}$ is undefined; and
the distance metric for each pair of subword units is calculated in a sequence such that $S(p_{i-1}, d_{j-1})$, $S(p_{i-1}, d_j)$, and $S(p_i, d_{j-1})$ are determined previously to determining $S(p_i, d_j)$.

A pair of subword units is undefined if they indicate a pair that is not defined or has no meaning, such as a pair of subword units from positions that precede the beginning of the input pattern 76 and/or the reference pattern 72. For example, suppose that a subword unit pair is indicated by a position $p_{i-1}$, $d_{j-1}$ and i has a value of 0 (indicating the first position for a subword unit in the input pattern 76 extending from positions 0 to n) and j has a value of 0 (indicating the first position for a subword unit in the reference pattern 72 extending from positions 0 to m). Then, the positions indicated by i−1 and j−1 have no meaning, because they would indicate a subword unit pair in a position (−1,−1) that precedes the beginning of the input pattern 76 and beginning of the reference pattern 72.

In one embodiment, the computing of this metric 83 uses a classical dynamic programming technique. The insertion, deletion, and substitution costs are obtained from a precomputed confusion matrix as described previously. In addition to the cost of matching pattern P with D, a length penalty is applied. The length penalty is computed by evaluating the phoneme string length difference between the decode phoneme string (e.g., input pattern 76) and the pronunciation string (e.g., reference pattern 72) from the dictionary. For example, if the input pattern 76 is greatly different in length from the reference pattern 72, then the length penalty would have a value indicating that the match is not likely to be valid.

A pair of subword units is undefined if they indicate a pair that is not defined or having no meaning, such as a pair of subword units from positions that precede the beginning of the input pattern 76 and/or the reference pattern 72. That is, if a subword unit is indicated by $p_{i-1}$, $d_{j-1}$, and i has a value of 0 (indicating the first subword unit in the input pattern 76) and j has a value of 0 (indicating the first subword unit in the reference pattern 72), then the positions indicated by i−1 and j−1 have no meaning, because they would indicate subword unit positions that precede the beginning of the input pattern 76 and beginning of the reference pattern 72.

In step 210, the second vocabulary look up 36 generates a set of hypothetical matches by sorting the source set of reference patterns 72 based on a closeness of each reference pattern 72 to correctly matching the input pattern 76. That is, this sorting is based on the evaluation of each generated pattern comparison, as indicated by the matching score on word distance measures 83. The subword detection vocabulary look up 36 compares the input pattern 76 (e.g., phoneme sequence) produced by the phoneme or subword decoder 34, to each reference pattern 72 (e.g., word) in the vocabulary (e.g., pronunciation dictionary 38) using the distance metric 83 equations as described above. The word pronunciation distance is then used to sort the whole vocabulary, the most likely word being placed at the top of the list.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining a plurality of hypothetical matches to a spoken input, comprising the computer-implemented steps of:
   detecting subword units in the spoken input to generate a first set of hypothetical matches to the spoken input;
   detecting words in the spoken input to generate a second set of hypothetical matches to the spoken input; and
   combining the first set of hypothetical matches with the second set of hypothetical matches to produce a combined set of hypothetical matches to the spoken input, the combined set having a predefined number of hypothetical matches, and wherein the combined set of hypothetical matches is an ordered list comprising a highest ranking hypothetical match in the second set of hypothetical matches, followed by an ordered set of hypothetical matches based on the first set of hypothetical matches.

2. The method of claim 1, wherein the step of detecting subword units includes
   detecting the subword units in the spoken input based on an acoustic model of the subword units and a language model of the subword units;
   generating pattern comparisons between (i) an input pattern corresponding to the subword units in the spoken input and (ii) a source set of reference patterns based on a pronunciation dictionary, each generated pattern comparison based on the input pattern and one of the reference patterns; and
   generating the first set of the hypothetical matches by sorting the source set of reference patterns based on a closeness of each reference pattern to correctly matching the input pattern based on an evaluation of each generated pattern comparison, each evaluation determining a word pronunciation distance measure that indicates how close each input pattern is to matching each reference pattern.

3. The method of claim 1, wherein the combined set of hypothetical matches is an ordered list based on ranking confidence levels for each hypothetical match.

4. The method of claim 1, wherein the subword units include at least one phoneme.

5. The method of claim 1, wherein the hypothetical matches are words.

6. A method for determining a plurality of hypothetical matches to a spoken input, comprising the computer-implemented steps of:
   detecting subword units in the spoken input to generate a first set of hypothetical matches to the spoken input;
   detecting words in the spoken input to generate a second set of hypothetical matches to the spoken input; and
   combining the first set of hypothetical matches with the second set of hypothetical matches to produce a combined set of hypothetical matches to the spoken input, the combined set having a predefined number of hypothetical matches, wherein the step of detecting subword units includes
   detecting the subword units in the spoken input based on an acoustic model of the subword units and a language model of the subword units;
   generating pattern comparisons between (i) an input pattern corresponding to the subword units in the spoken input and (ii) a source set of reference patterns based on a pronunciation dictionary, each generated pattern comparison based on the input pattern and one of the reference patterns; and
   generating the first set of the hypothetical matches by sorting the source set of reference patterns based on a closeness of each reference pattern to correctly matching the input pattern based on an evaluation of each generated pattern comparison, each evaluation determining a word pronunciation distance measure that indicates how close each input pattern is to matching each reference pattern.

7. A computer system for determining a plurality of hypothetical matches to a spoken input, comprising:
   a subword decoder for detecting subword units in the spoken input to generate a first set of hypothetical matches to the spoken input;

a word decoder detecting words in the spoken input to generate a second set of hypothetical matches to the spoken input; and a list fusion module for combining the first set of hypothetical matches with the second set of hypothetical matches to produce a combined set of hypothetical matches to the spoken input, the combined set having a predefined number of hypothetical matches, and wherein the combined set of hypothetical matches is an ordered list comprising a highest ranking hypothetical match in the second set of hypothetical matches, followed by an ordered set of hypothetical matches based on the first set of hypothetical matches.

8. The computer system of claim 7, wherein the subword decoder detects the subword units in the spoken input based on an acoustic model of the subword units and a language model of the subword units;

generates pattern comparisons between (i) an input pattern corresponding to the subword units in the spoken input and (ii) a source set of reference patterns based on a pronunciation dictionary, each generated pattern comparison based on the input pattern and one of the reference patterns; and generates the first set of the hypothetical matches by sorting the source set of reference patterns based on a closeness of each reference pattern to correctly matching the input pattern based on an evaluation of each generated pattern comparison, each evaluation determining a word pronunciation distance measure that indicates how close each input pattern is to matching each reference pattern.

9. The computer system of claim 7, wherein the combined set of hypothetical matches is an ordered list based on ranking confidence levels for each hypothetical match.

10. The computer system of claim 7, wherein the subword units include at least one phoneme.

11. The computer system of claim 7, wherein the hypothetical matches are words.

12. A computer system for determining a plurality of hypothetical matches to a spoken input, comprising:

a subword decoder for detecting subword units in the spoken input to generate a first set of hypothetical matches to the spoken input;

a word decoder detecting words in the spoken input to generate a second set of hypothetical matches to the spoken input; and a list fusion module for combining the first set of hypothetical matches with the second set of hypothetical matches to produce a combined set of hypothetical matches to the spoken input, the combined set having a predefined number of hypothetical matches, wherein the subword decoder:

detects the subword units in the spoken input based on an acoustic model of the subword units and a language model of the subword units;

generates pattern comparisons between (i) an input pattern corresponding to the subword units in the spoken input and (ii) a source set of reference patterns based on a pronunciation dictionary, each generated pattern comparison based on the input pattern and one of the reference patterns; and generates the first set of the hypothetical matches by sorting the source set of reference patterns based on a closeness of each reference pattern to correctly matching the input pattern based on an evaluation of each generated pattern comparison, each evaluation determining a word pronunciation distance measure that indicates how close each input pattern is to matching each reference pattern.

13. A computer program product comprising:

a computer usable medium for determining a plurality of hypothetical matches to a spoken input; and a set of computer program instructions embodied on the computer useable medium, including instructions to:

detect subword units in the spoken input to generate a first set of hypothetical matches to the spoken input;

detect words in the spoken input to generate a second set of hypothetical matches to the spoken input; and combine the first set of hypothetical matches with the second set of hypothetical matches to produce a combined set of hypothetical matches to the spoken input, the combined set having a predefined number of hypothetical matches, and the combined set being an ordered list comprising a highest ranking hypothetical match in the second set of hypothetical matches, followed by an ordered set of hypothetical matches based on the first set of hypothetical matches.

14. A method for determining a plurality of hypothetical matches to a spoken input by detecting subword units in the spoken input, comprising the computer-implemented steps of:

detecting the subword units in the spoken input based on an acoustic model of the subword units and a language model of the subword units;

generating pattern comparisons between (i) an input pattern corresponding to the subword units in the spoken input and (ii) a source set of reference patterns based on a pronunciation dictionary, each generated pattern comparison based on the input pattern and one of the reference patterns; and generating a set of the hypothetical matches by sorting the source set of reference patterns based on a closeness of each reference pattern to correctly matching the input pattern based on an evaluation of each generated pattern comparison, each evaluation determining a word pronunciation distance measure that indicates how close each input pattern is to matching each reference pattern.

15. The method of claim 14, wherein the pattern comparisons are based on a confusion matrix that stores the likelihood of confusion between pairs of subword units, the likelihood of deleting each subword unit, and the likelihood of inserting each subword unit.

16. The method of claim 15, further comprising a step of training the confusion matrix based on an output of an subword decoder, the output produced from an acoustic input of a training data set input to the subword decoder.

17. The method of claim 15, further comprising the step of computing the confusion matrix by determining an entry in the confusion matrix for each unique subword unit that is in the set of reference patterns.

18. The method of claim 14, wherein the step of detecting subword units is performed in a client computer, and the steps of generating pattern comparisons and generating the set of hypothetical matches are performed in a server computer.

19. The method of claim 14, wherein the step of generating the set of hypothetical matches includes:

determining pairs of subword units by pairing an input subword unit from the input pattern with a reference subword unit from the reference pattern; and providing the word pronunciation distance measure by calculating a distance metric for each pair of subword units, the distance metric defined as follows:

$$S(p_0, d_0) = 0$$

$$S(p_i, d_j) = \min \left\{ \begin{array}{l} S(p_{i-1}, d_{j-1}) + C_{subs}(p_i, d_j) \\ S(p_{i-1}, d_j) + C_{del}(p_i) \\ S(p_i, d_{j-1}) + C_{ins}(d_j) \end{array} \right\}$$

$$S(P, D) = S(p_n, d_m) + LP(p_n, d_m)$$

wherein:
S(P,D) is a distance between word P and D; P is a given input pattern, and D, a given reference pattern;
$S(p_i,d_j)$ is a score of the given input pattern matching a given subword unit $p_i$, of P, and a given subword unit $d_j$ of D;
$C_{subs}(p_i,d_j)$ is a cost of substituting the given subword unit $p_i$ of P with the given subword unit $d_j$ of D;
$C_{del}(p_i)$ is a cost of deleting the given subword unit $p_i$ of P;
$C_{ins}(d_j)$ is a cost of inserting the given subword unit $d_j$ of D;
$LP(p_n,d_m)$ is a length penalty of the given input pattern $p_n$ matching the given reference pattern $d_m$, n is the length of P, and m is the length of D;
$S(p_{i-1},d_{j-1})$ has a value of zero (0) if $p_{i-1},d_{j-1}$ is undefined;
$S(p_{i-1},d_j)$ has the value of zero (0) if $p_{i-1},d_j$ is undefined;
$S(p_i,d_{j-1})$ has the value of zero (0) if $p_i,d_{j-1}$ is undefined; and
the distance metric for each pair of subword units is calculated in a sequence such that $S(p_{i-1},d_{j-1})$, $S(p_{,i-1},d_j)$, and $S(p_i,d_{j-1})$ are determined previously to determining $S(p_i,d_j)$.

20. The method of claim 14, wherein the subword units include at least one phoneme.

21. A computer system for determining a plurality of hypothetical matches to a spoken input by detecting subword units in the spoken input, comprising:
a subword decoder for detecting the subword units in the spoken input based on an acoustic model of the subword units and a language model of the subword units; and
a subword detection vocabulary look up module for generating pattern comparisons between (i) an input pattern corresponding to the subword units in the spoken input and (ii) a source set of reference patterns based on a pronunciation dictionary, each generated pattern comparison based on the input pattern and one of the reference patterns;
the subword detection vocabulary look up module generating a set of the hypothetical matches by sorting the source set of reference patterns based on a closeness of each reference pattern to correctly matching the input pattern based on an evaluation of each generated pattern comparison, each evaluation determining a word pronunciation distance measure that indicates how close each input pattern is to matching each reference pattern.

22. The computer system of claim 21, wherein the pattern comparisons are based on a confusion matrix that stores the likelihood of confusion between pairs of subword units, the likelihood of deleting each subword unit, and the likelihood of inserting each subword unit.

23. The computer system of claim 22, wherein the confusion matrix is trained on an output of the subword decoder, the output produced from an acoustic input of a training data set to the subword decoder.

24. The computer system of claim 22, wherein the confusion matrix is based on determining an entry in the confusion matrix for each unique subword unit that is in the set of reference patterns.

25. The computer system of claim 21, wherein the subword decoder is part of a client computer, and the subword detection vocabulary look up module is part of a server computer.

26. The computer system of claim 21, wherein the subword detection vocabulary look up module
determines pairs of subword units by pairing an input subword unit from the input pattern with a reference subword unit from the reference pattern; and
provides the word pronunciation distance measure by calculating a distance metric for each pair of subword units, the distance metric defined as follows:

$$S(p_0, d_0) = 0$$

$$S(p_i, d_j) = \min \left\{ \begin{array}{l} S(p_{i-1}, d_{j-1}) + C_{subs}(p_i, d_j) \\ S(p_{i-1}, d_j) + C_{del}(p_i) \\ S(p_i, d_{j-1}) + C_{ins}(d_j) \end{array} \right\}$$

$$S(P, D) = S(p_n, d_m) + LP(p_n, d_m)$$

wherein:
S(P,D) is a distance between word P and D; P is a given input pattern, and D, a given reference pattern;
$S(p_i,d_j)$ is a score of the given input pattern matching a given subword unit $p_i$ of P, and a given subword unit $d_j$ of D;
$C_{subs}(p_i,d_j)$ is a cost of substituting the given subword unit $p_i$ of P with the given subword unit $d_j$ of D;
$C_{del}(p_i)$ is a cost of deleting the given subword unit $p_i$ of P;
$C_{ins}(d_j)$ is a cost of inserting the given subword unit $d_j$ of D;
$LP(p_n,d_m)$ is a length penalty of the given input pattern $p_n$ matching the given reference pattern $d_m$, n is the length of P, and m is the length of D;
$S(p_{i-1},d_{j-1})$ has a value of zero (0) if $p_{i-1},d_{j-1}$ is undefined;
$S(p_{i-1},d_j)$ has the value of zero (0) if $p_{i-1},d_j$ is undefined;
$S(p_i,d_{j-1})$ has the value of zero (0) if $(p_i,d_{j-1})$ is undefined; and
the distance metric for each pair of subword units is calculated in a sequence such that $S(p_{i-1},d_{j-1})$, $S(p_{i-1},d_j)$, and $S(p_i,d_{j-1})$, are determined previously to determining $S(p_i,d_j)$.

27. The computer system of claim 21, wherein the subword units include at least one phoneme.

28. A computer program product comprising:
a computer usable medium for determining a plurality of hypothetical matches to a spoken input by detecting subwords in the spoken input; and
a set of computer program instructions embodied on the computer useable medium, including instructions to:
detect the subword units in the spoken input based on an acoustic model of the subword units and a language model of the subword units;
generate pattern comparisons between (i) an input pattern corresponding to the subword units in the spoken input and (ii) a source set of reference patterns based on a pronunciation dictionary, each generated pattern comparison based on the input pattern and one of the reference patterns; and generate a set of the hypothetical matches by sorting the source set of reference patterns based on a closeness of each reference pattern to correctly matching the input pattern based on an evaluation of each generated pattern comparison, each evaluation determining a word pronunciation distance measure that indicates how close each input pattern is to matching each reference pattern.

* * * * *